P. N. BURKE.

Cooking Stove.

No. 1,027. Reissued Aug. 21, 1860.

Witness:
R. T. Campbell.

Inventor:
Peter N. Burke.

N. PETERS, Photo-Lithographer, Washington, D. C.

UNITED STATES PATENT OFFICE.

PETER N. BURKE, OF BUFFALO, NEW YORK.

IMPROVEMENT IN STOVES.

Specification forming part of Letters Patent No. 24,791, dated July 19, 1859; Reissue No. 1,027, dated August 21, 1860.

*To all whom it may concern:*

Be it known that I, PETER N. BURKE, of Buffalo, in the county of Erie and State of New York, have invented certain new and useful Improvements in Cooking Stoves; and I do hereby declare that the following is a full, clear, and exact description of the same, reference being had to the accompanying drawings, forming part of this specification, in which—

Figure 1:
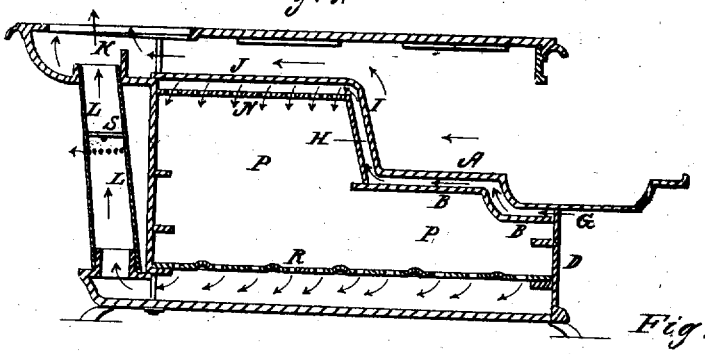
Figure 3:
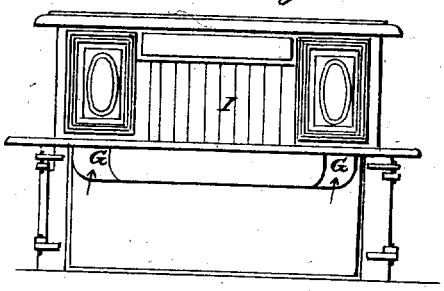
Figure 4:
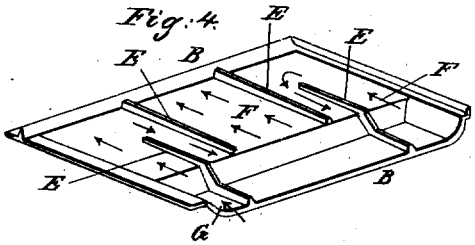
Figure 2:
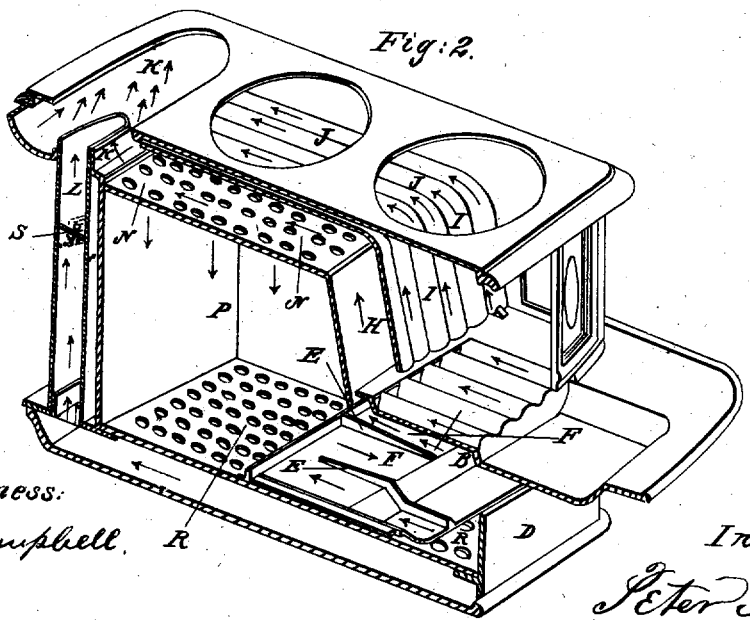

Figure 1 is a longitudinal vertical section taken through a cook-stove constructed upon my improved plan. Fig. 2 is a perspective view of one half of the stove, showing by red and black arrows the direction of the currents through the stove to the escape-pipe. Fig. 3 exhibits the front of the stove of Figs. 1 and 2, showing the registers through which air passes into the flues provided for it. Fig. 4 represents the lower plate for forming the flue-chamber underneath the hearth-plate and fire-hearth.

Similar letters of reference indicate corresponding parts in the several figures.

The object of this invention and improvement in cooking-stoves, ranges, &c., is to dispense with the ordinary smoke-flues, where the products of combustion are carried throughout the stove and the active heat is utilized by radiation alone. In such stoves where the smoke is allowed to pass around the ovens they soon become thickly coated with soot, and consequently a large amount of heat is lost, the baking qualities of the stove are injured, and it is necessary to frequently take the stove apart in order to clean out the flues and oven.

The following description will illustrate the application of my invention to the common form of wood cook-stove. The same principle may be also applied to various forms and description of stoves, ranges, and ovens with only a slight alteration of the arrangement, form, and dimension of the parts, the same principle being preserved throughout.

In the drawings, the fire-hearth is represented by A, which is a corrugated plate. Below this hearth is arranged a plate, B, which, in connection with hearth A, forms an intermediate space, C. The lower plate, B, which abuts against the front plate, D, of the stove, has arranged upon its surface partitions E, which, when the two plates A B are brought together, form compartments or flue-spaces F, which direct the current of air as it is drawn in through the register-openings G to the rear part of the plate and return it to the central passage, F′, from whence it passes into the flue H, the outer plate of which is corrugated, as in the hearth-plate. The flue-space directs the air upward, as indicated by the red arrows, and submits it to the heating surface of the fire-guard I, where it is dispersed over the perforated plate and equally diffused throughout the oven or ovens, as the case may be, as hereinafter described. The products of combustion are carried over the corrugated plate J and to the rear part of the stove, where they are brought in contact with the heated air rising from the oven through the hot-air pipe L, as indicated by the red and black arrows, these showing the direction of the two currents through the stove. These currents, both tending to the common smoke-pipe, (not shown by the drawings,) meet in the chamber K, where the smoke, &c., is exposed to the highly-heated air, and thus consumed, and passed off through a direct smoke-pipe, or it may then be employed to heat water which is contained in a boiler (not shown) partially surrounded with a jacket or casing, through which the heated air passes in communicating with the smoke pipe, connected with the top of this boiler. The air, having been subjected to the heating-surfaces of plates A I J, passes down through perforations in horizontal diffusing plate N and into the oven P of the stove, and over and around the articles to be cooked, and thence through apertures in the diffusing-plate R and to the rear of the stove, where the air passes up through the pipe L into chamber K, as above specified. The arrangement and construction of these plates is very peculiar in order to effect the desired purpose, viz., the equitable diffusion of the hot air throughout the entire oven from the time it commences to descend or pass through the perforations of plate N. I therefore arrange the perforations in the upper plates so as to compensate for the different degrees of draft over its surface by making the perforations smallest where the draft is greatest and enlarging them where there is the least draft. In this manner the hot air passes over the plate N to its rear end, and is equally distributed in its descent and diffused throughout the entire oven. The lower plate, R, is also perforated, but the order of perforations is reversed, the largest holes being placed where the draft would be the least and the smaller holes at the rear of the oven immediately below the large perforations of the upper plate, N. In this manner the hot air is uniformly diffused throughout the oven, and every part thereof, with the contents, perfectly heated.

Heretofore a serious practical difficulty has been experienced in the use of stoves in which the oven was heated by hot air because the air could not be uniformly diffused through the oven. The cooking would be irregular and imperfect, because the oven would be hotter in some parts than in others, so that some articles would become too highly cooked while others were not sufficiently heated; but by the use of my diffusing-plates, with varying perforations throughout the surface, every part of the oven is uniformly heated and the hot air is diffused in the most perfect manner, rendering the operation of cooking within the oven always certain and perfect.

The aforesaid diffusing-plates may be employed in every description of stoves in which it is necessary to diffuse the hot air uniformly through the oven or other chamber, and the particular position in which said plates are arranged is a matter of little consequence. The essential point is that they shall be constructed substantially as herein shown and described—that is to say, with the perforations increasing in size from the point or line where the current of hot air first or most strongly impinges upon the surface of said plates.

The regulation of the passage of air through the stove is effected by common registers placed below and on each side of the hearth, and when it is desired to radiate the heated air into the room the damper S in the hot-air pipe L is closed, when the air passes out through apertures in said pipe, arranged below the damper, as indicated by red arrows, Fig. 1, in the drawings.

Having thus described my invention, what I claim as new, and desire to secure by Letters Patent, is—

1. The employment of diffusing-plates, constructed substantially as herein shown and described, to promote the uniform distribution of hot air, as set forth.

2. The arrangement and combination of the perforated plated N R, the partitional plate B, the flue H, the fire-guard I, hot-air pipe L and chamber K, substantially as and for the purpose herein shown and described.

PETER N. BURKE.

Witnesses:

B. GIROUXE,

M. M. LIVINGSTON.